(12) United States Patent
Parrella et al.

(10) Patent No.: US 6,205,155 B1
(45) Date of Patent: Mar. 20, 2001

(54) APPARATUS AND METHOD FOR LIMITING DATA BURSTS IN ATM SWITCH UTILIZING SHARED BUS

(75) Inventors: Eugene L. Parrella, Monroe; Subhash C. Roy, Stamford, both of CT (US)

(73) Assignee: TranSwitch Corp., Shelton, CT (US)

( * ) Notice: Subject to any disclaimer, the term of this patent is extended or adjusted under 35 U.S.C. 154(b) by 0 days.

(21) Appl. No.: 09/263,288

(22) Filed: Mar. 5, 1999

(51) Int. Cl.[7] .................................................. H04J 3/02
(52) U.S. Cl. ...................... 370/462; 370/235; 370/412; 370/428; 370/462
(58) Field of Search ................................ 370/231, 232, 370/235, 236, 388, 389, 390, 412, 413, 419, 428, 461, 462, 463, 417, 252, 362

(56) References Cited

U.S. PATENT DOCUMENTS

| | | | |
|---|---|---|---|
| 4,149,144 | 4/1979 | Diefenderfer | 340/147 R |
| 4,156,798 | 5/1979 | Doelz | 179/15 AL |
| 4,375,681 | 3/1983 | Abbott et al. | 370/16 |
| 4,460,993 | 7/1984 | Hampton et al. | 370/84 |
| 4,488,293 | 12/1984 | Haussmann et al. | 370/84 |
| 4,660,169 | 4/1987 | Norgren et al. | 364/900 |
| 4,685,101 | 8/1987 | Segal et al. | 370/84 |
| 4,727,536 | 2/1988 | Reeves et al. | 370/84 |
| 4,750,168 | 6/1988 | Trevitt | 370/84 |
| 4,763,320 | 8/1988 | Rudolph | 370/85 |
| 4,789,926 | 12/1988 | Clarke | 364/200 |
| 4,815,074 | 3/1989 | Jacobsen | 370/112 |
| 4,817,037 | 3/1989 | Hoffman et al. | 364/200 |
| 5,084,872 | 1/1992 | Le Cucq et al. | 370/94.2 |
| 5,163,048 | 11/1992 | Heutink | 370/85.6 |
| 5,172,373 | 12/1992 | Suzuki | 370/85.11 |
| 5,263,023 | 11/1993 | Sevenhans | 370/85.11 |
| 5,438,567 | * 8/1995 | Ikeda | 370/417 |
| 5,457,687 | * 10/1995 | Newman | 370/232 |
| 5,689,500 | * 11/1997 | Chiusai et al. | 370/235 |

OTHER PUBLICATIONS

PCI Local Bus Specification, Revision 2.0, Apr. 30, 1993, 192 pages. PCI Special Interest Group.

Mitel Corporation, Integrated PCM Filter/Codec, 1988, pp. 4–151,4–171, and Application Note MSAN–126, pp. 5–261 thru 5–267.

Intel, Microprocessor and Peripheral Handbook, vol. 1, Microprocessor, 1989, pp. 2–222 thru 2–240.

* cited by examiner

*Primary Examiner*—Douglas W. Olms
*Assistant Examiner*—Shick Hom
(74) *Attorney, Agent, or Firm*—David P. Gordon; David S. Jacobson; Thomas A Gallagher

(57) ABSTRACT

An ATM switch system has a plurality of input ports and output ports all having associated buffers, and a source traffic control system which includes a shared bus coupling the ports, and a switch controller or arbiter which controls the transfer of data among the ports via the shared bus. ATM cells placed on the shared bus include an internal destination address which designates the output port within the switch to which the ATM cell is destined. The switch controller monitors the internal destination addresses of the ATM cells, and increments a counter associated with the destination port when the destination corresponds, and decrements other counters which do not correspond to the destination. Accordingly, bursts for a particular output port causes the count of the associated counter to grow large; whereas frequent or long breaks cause the count to drop. The counts are compared to a high threshold which alerts the arbiter that the buffer of the output port being tracked is in danger of overflowing. Upon receiving the alert, the arbiter either stalls the bus by refusing to grant access to the bus until the counter decrements below the first threshold, or grants bus access to the input port associated with the output port on the theory that the input port will not be sending data to its own output. A low threshold is utilized to declare that a burst is over and to free the counter for tracking a new burst to the same or a different output port.

17 Claims, 3 Drawing Sheets

| CLOCK CYCLE | ← — — — — — — — — 32 BITS — — — — — — — — → | | | |
|---|---|---|---|---|
| 0 | REQUEST FIELD ||||
| 1 | INTERNAL ROUTING FIELD (OPTIONAL) ||||
| 2 | A B C D  VPI | | VCI | P T I  C L P |
| 3 | BYTE 3 | BYTE 2 | BYTE 1 | BYTE 0 |
| 4 | BYTE 7 | BYTE 6 | BYTE 5 | BYTE 4 |
| 5 | BYTE 11 | BYTE 10 | BYTE 9 | BYTE 8 |
| 6 | BYTE 15 | BYTE 14 | BYTE 13 | BYTE 12 |
| 7 | BYTE 19 | BYTE 18 | BYTE 17 | BYTE 16 |
| 8 | BYTE 23 | BYTE 22 | BYTE 21 | BYTE 20 |
| 9 | BYTE 27 | BYTE 26 | BYTE 25 | BYTE 24 |
| 10 | BYTE 31 | BYTE 30 | BYTE 29 | BYTE 28 |
| 11 | BYTE 35 | BYTE 34 | BYTE 33 | BYTE 32 |
| 12 | BYTE 39 | BYTE 38 | BYTE 37 | BYTE 36 |
| 13 | BYTE 43 | BYTE 42 | BYTE 41 | BYTE 40 |
| 14 | BYTE 47 | BYTE 46 | BYTE 45 | BYTE 44 |
| 15 | SYSTEM CONTROL ||| GEN G RN AU NM T |

FIG. 2

APPARATUS AND METHOD FOR LIMITING DATA BURSTS IN ATM SWITCH UTILIZING SHARED BUS

The present invention is related to co-owned U.S. Ser. No. 08/960,499 filed Oct. 29, 1997, now U.S. Pat. No. 5,901,146 and Ser. No. 08/961,932 filed Oct. 29, 1997, now U.S. Pat. No. 6,104,724, which are hereby incorporated by reference herein in their entireties.

BACKGROUND OF THE INVENTION

1. Field of the Invention

The present invention relates to telecommunications apparatus and methods. More particularly, the present invention relates to ATM switch arbitration apparatus and methods for limiting data bursts in the switch, and thereby permitting simplified output port electronics.

2. State of the Art

Asynchronous transfer mode (ATM) is perhaps the fastest growing segment of the telecommunications backbone. The purpose of ATM is to provide a high-speed, low-delay multiplexing and switching network which supports all types of user traffic, including voice, data, and video. ATM data is transported in fixed-length "cells" which are fifty-three bytes in length, including a five byte header and a forty-eight byte data packet. The header includes virtual path and virtual circuit identifiers (VPI and VCI) which are used by the ATM network in relaying the traffic through switches of the network and to its customer premise equipment (CPE) destinations.

Many different ATM switches are known in the art. Generally, the switches have a plurality of input ports with input queue buffers, a plurality of output ports with associated queue buffers, and a source traffic control system which includes a switch fabric or bus mechanism and a switch controller which controls the transfer of data among the ports. A well-accepted source traffic control system for accomplishing switching is known in the art as CELLBUS® (a registered trademark of the assignee hereof TranSwitch, Corp.) which is described in detail in the previously incorporated patent application Ser. Nos. 08/960,499 and 08/961,932. The CELLBUS® mechanism is an asynchronous data transfer and source traffic control system which includes a bus master (switch controller) and a plurality of bus users (ports) coupled to a bidirectional data bus. The bus master preferably provides two clock signals to each bus user, a system clock and a frame clock. The frame clock designates the start of a frame. A frame format preferably includes fifteen or sixteen system clock cycles, the first of which is designated the request field and the last of which includes a grant field. One or more other cycles may be assigned control and/or routing information and the remainder of the cycles comprise a data field of fixed length. During the request field, any number of bus users may request access which is received by the bus master. During the grant field, the bus master grants access to a selected bus user for the entire data portion of the next frame. Which user is granted access to the next frame is determined according to an arbitration algorithm in the bus master which may be unknown to the bus users.

In the CELLBUS® system, as well as in other source traffic control systems, arbitration for access to the shared bus in order to accomplish switching is based on knowledge of the sender's identity. As described in the previously incorporated patent applications, simple arbitration algorithms, such as round-robin, may be used, resulting in the utilization of simple arbiters of low complexity and cost. While round-robin and other simple arbitration algorithms generally reduce the cost and complexity of the arbiters, additional cost is generated in the input buffers, as each input buffer must be long enough to allow for the time the port waits for bus access. More complex arbitration systems are known which reduce input buffer costs. However, regardless of the complexity of the arbitration system, no mechanisms are presently available in ATM switches which employ shared buses to reduce output port buffers. Indeed, in the systems of the art, it is not uncommon that long bursts from a single input port which are intended for a single output port are broken only by short bursts to other ports. This bursty traffic necessitates a worst case design of output port electronics at both a hardware and software level, as each port must be capable of accepting data at the speed of the bus for an indeterminate amount of time. The result is an expensive design with large high speed memories (buffers).

SUMMARY OF THE INVENTION

It is therefore an object of the present invention to provide an ATM switch with an arbitration system which reduces output port buffer requirements.

It is another object of the invention to provide an ATM switch with means for tracking the internal destination of packets within the switch, and for limiting bursts destined for any particular output port.

It is an additional object of the invention to provide methods of controlling traffic within an ATM switch in order to reduce output port buffer requirements.

In accord with the objects of the invention, an ATM switch system is provided and generally includes a plurality of input ports with associated input buffer memories, a plurality of output ports with associated buffer memories, and a source traffic control system which preferably includes a shared bus which couples the input ports and the output ports, and a switch controller or arbiter which controls the transfer of data among the ports via the shared bus. In the preferred embodiment of the invention, each ATM cell which is placed on the shared bus includes the usual forty-eight bytes of data payload, several (e.g., four) bytes of predefined overhead (VPI, VCI, etc.), and several bytes of switch-specific information including an internal destination address (also called an internal routing field). The internal destination address designates the output port within the switch to which the ATM cell is destined.

According to the invention, means associated with the arbiter are provided to track the destinations of the ATM cells and prevent any particular output port from being overloaded by ongoing bursts of traffic. More particularly, in the preferred embodiment, the arbiter is coupled to the shared bus and monitors the destination address of each cell placed on the shared bus. The arbiter utilizes two or more counters, each having associated with it an address register containing the address of the output port which has most recently received or is presently receiving the traffic burst. The counter is incremented (preferably by one) each time a packet is sent to the specific destination associated with the counter. When a packet is sent to a destination other than the one for which the counter is tracking, the counter is decremented; preferably by a value greater than or equal to one). Accordingly, as a burst destined for a particular output port continues, the count of the counter grows large; whereas as breaks occur more frequently or for a long period of time, the count drops.

According to a preferred aspect of the invention, two thresholds are defined for the counters. A first (high) threshold is utilized to alert the arbiter that the buffer of the output port being tracked by the counter is in danger of overflowing. Upon receiving the alert, the arbiter either stalls the bus by refusing to grant access to the bus until the counter decrements below the first threshold, or alternatively grants bus access to the input port associated with the output port on the theory that the input port will not be sending data to its own output. A second (low) threshold is utilized to declare that a burst is over and to free the counter for tracking a new burst to the same or a different output port.

Additional objects and advantages of the invention will become apparent to those skilled in the art upon reference to the detailed description taken in conjunction with the provided figures.

BRIEF DESCRIPTION OF THE DRAWINGS

FIG. 2 is a chart showing a representative bus frame according to the preferred embodiment of the invention.

DETAILED DESCRIPTION OF THE PREFERRED EMBODIMENTS

Figure 1:
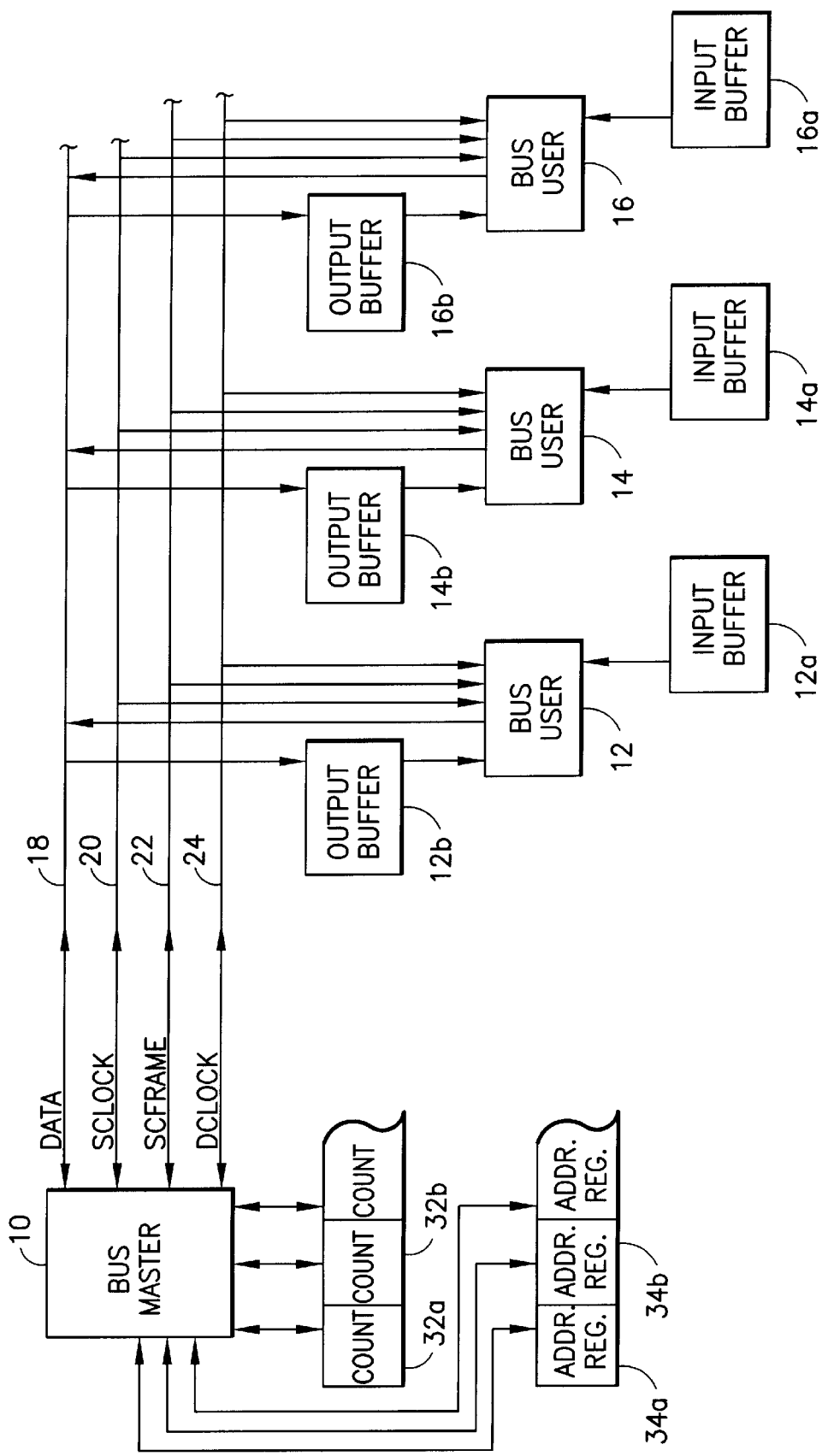
FIG. 1 is a high level block diagram of the switch of the invention.

Referring now to FIG. 1, a preferred embodiment of the switch of the invention includes a bus master 10, a plurality of bus users 12, 14, 16, a bidirectional data bus 18 which is coupled to the bus master 10 and the users 12, 14, 16, a system clock bus 20, a frame clock bus 22, and a data clock bus 24. The bus users which are typically implemented as ASICs include input and output ports with input buffers or queues 12a, 14a, 16a, which receive data from sources external the switch, and output buffers 12b, 14b, 16b, which receive data from internal the switch. As will be appreciated by those skilled in the art, the bus users, in their input port capacity, are capable of receiving ATM data, processing the overhead of that ATM data as necessary, generating changed or additional overhead as necessary, requesting access to the bidirectional data bus 18, and placing data onto the bus when enabled. In their output port capacity, the bus users are capable of receiving data from the bidirectional bus 18, processing the overhead of that ATM data as necessary, generating changed or additional overhead as necessary, and sending the data external the switch.

Although only three bus users 12, 14, 16 are shown, it will be appreciated that many bus users can be coupled to the buses 18, 20, 22 as suggested by the dotted lines in FIG. 1. As mentioned above, the data bus 18 is bidirectional to allow any of the bus users 12, 14, 16 and the bus master 10 to transfer data onto or off of the data bus 18. The clock buses 20, 22 are driven by the bus master 10 and are "read only" by all the bus users 12, 14, 16. The data bus 18 is preferably 32-bits wide allowing the transfer of two 16-bit words (4 bytes) during a single cycle of the system clock 20. The data clock bus 24 is driven by the bus user 12, 14, 16 which is granted access to the data bus, and is read by all of the other bus users 12, 14, 16.

The bus master 10 is preferably implemented in a DSP or a microprocessor and functions as the switch controller (arbiter). As will be discussed in greater detail hereinafter, according to the preferred embodiment of the invention, among other things, the bus master monitors the data bus for the internal destination (routing field) of cells being placed on the bidirectional bus 18, and utilizes a plurality of counters 10a, 10b, . . . to track bursts which might overburden the output buffers 12b, 14b, 16b . . . of the output ports of users 12, 14, 16 . . .

In accord with the preferred embodiment of the invention, the structure of the data transfer among bus users 12, 14, 16 or between a bus user and the bus master 10 is accomplished through a bus frame. In the preferred embodiment of the invention, the frame consists of sixteen cycles of the system clock 20. The first cycle of the frame is designated by an active signal on the system frame bus 22. A representative frame according to the invention is shown in FIG. 2.

Before turning to FIG. 2, it should be appreciated that the data transfer format of the bus is designed to accommodate the transfer of the contents of ATM (asynchronous transfer mode) cells used in BISDN (broadband integrated services digital network) systems. The first cycle, driven by the bus users contains the "request" field. The second cycle, driven by one bus user, carries an internal cell routing prefix (i.e., destination address). The third cycle, driven by the bus user, carries the first four bytes of the ATM cell, containing cell VPI (virtual path indicator) and VCI (virtual circuit indictor) numbering fields, and the PTI (payload type indicator) and CLP (cell loss priority) fields. The next twelve cycles, also driven by the bus user, carry the forty-eight byte ATM cell payload. The final cycle of the bus frame is driven by the bus master, and contains information regarding which user is granted bus access during the next (succeeding) bus frame.

In particular, and as seen in FIG. 2, during the first clock cycle (0) of the frame, bus users transmit a "request" for access to the next following frame. The requests are transmitted by each user having access to one line of the data bus during clock cycle (0) and raising a flag (i.e., placing a "1" on the data bus) if the user is making a request. The combination of the unique request signals from each of, e.g., thirty-two bus users on the data bus results in a double word which indicates which of the bus users are making a request. For example, if there are thirty-two bus users and all are making a request, the double word will contain all "1's". Of course, if some or none of the users have a request, the double word will take a different form. If there are more than thirty-two bus users and the data bus is thirty-two bits wide, different schemes can be utilized to guarantee proper access of the users to the data bus as discussed in the previously incorporated patent applications.

Returning to the bus frame format of FIG. 2, the second clock cycle of the frame (1) is provided for an internal cell routing field as discussed in more detail below. The third clock cycle (2) of the frame contains the information fields of the ATM cell header as defined by the BISDN standard as set forth above. Based partially on the BISDN standard, the ATM cell header includes either a 4-bit GFC flow control field (in locations ABCD) with an 8-bit virtual path indicator VPI, a 16-bit virtual channel indicator VCI, a 3-bit payload type indicator, and a single bit indicator CLP (cell loss priority), or a 12-bit VPI, 16 bit VCI, 3-bit PTI and one bit CLP.

The fourth clock cycle (3) through the fifteenth clock cycle (14) of the bus frame contain the ATM cell "payload". Since each clock cycle permits the placement of a double word (32 bits) which is effectively four bytes onto the data bus, the twelve clock cycles permits forty-eight bytes of data to be placed on the bus by that bus user which received the previous grant.

The final clock cycle (15) of the frame contains information from the bus master identifying (based on arbitration) which bus user will have access to the next following frame.

In a system of thirty-two bus users, the bus user having next access to the frame is identified by a five bit grant number (Grant Num). The validity of the grant number is established by a grant enable bit (GEN). In a system of more than thirty-two bus users, additional system control bits will be used to identify page or group number relating to the request field described above.

According to the invention, the master 12 includes means 39 (e.g., a buffer) for reading the internal cell routing field (i.e., the internal destination address) of each cell placed onto the bidirectional data bus 18. The master 12 utilizes two or more counters 32a, 32b, ... each having associated with it an address register 34a, 34b, ... containing the address of the output port which has most recently received or is presently receiving the traffic burst. When the means for reading the internal cell routing field receives a new destination address, the master 12 checks the address registers 34a, 34b, ... to see whether that output port is being tracked. If it is, the master increments (INC) the counter associated with that output port (preferably by one). If the output port is not being tracked (i.e., no address register is associated with that output port), the master 12 designates a counter and an associated address register for that output port and provides an initial count. When a cell is sent to a destination other than the one for which a particular counter is tracking, that particular counter is decremented by the master by a decrement amount K. K is typically set $\geq 1$, and preferably K=2. Accordingly, as a burst destined for a particular output port continues, the count of the counter grows large; whereas as breaks occur more frequently or for a long period of time, the count drops.

It should be appreciated that selection of a value for K may be based on the speed at which an output port can absorb a burst. Because typical output port circuitry includes high speed memory circuitry which accepts small amounts of data from the bus at bus speed, plus additional memory which can only be accessed at slower rates, by examining the speed at which the high speed memory circuitry can dispose of data, a selection for K can be made.

According to a preferred aspect of the invention, two thresholds are defined for the counters 32a, 32b, .... A first (high) threshold (HT) is utilized to alert the master that the buffer of the output port being tracked by that counter is in danger of overflowing. Upon receiving the alert, according to one embodiment of the invention, the master stalls the bus by refusing to grant access to the bus until the counter decrements below the first threshold (e.g., by providing the master's grant number in the grant field). According to another embodiment of the invention, upon receiving the alert, the master grants bus access to the input port associated with the output port on the theory that the input port is unlikely to be sending data to its own output. A second (low) threshold (LT) is utilized to declare that a burst is over and to free the counter for tracking a new burst to the same or a different output port. In the preferred embodiment, HT>>1 (e.g., twenty-five), while LT=0.

Figure 3:
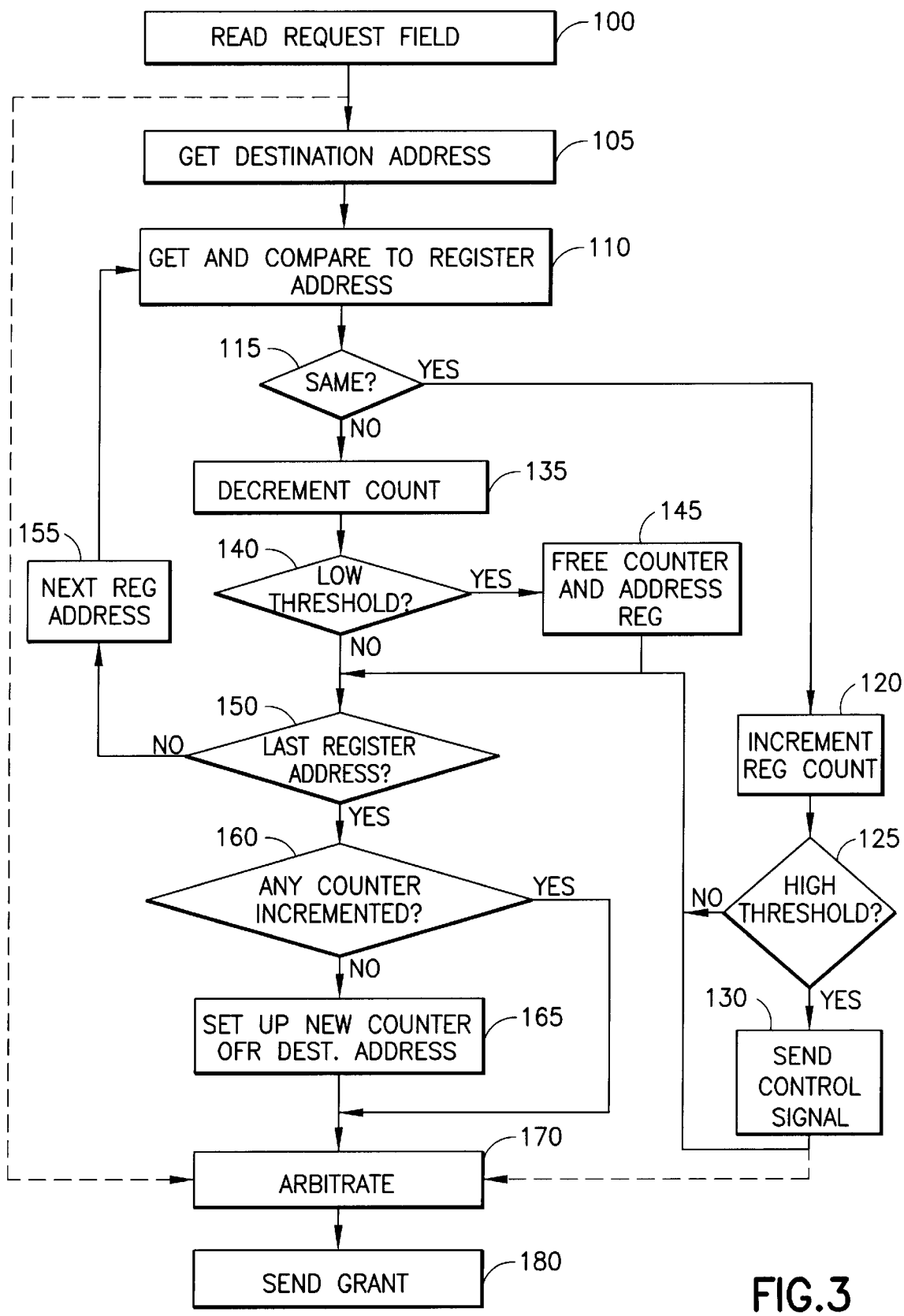
FIG. 3 is a flow chart setting forth the functioning of the master of the switch of FIG. 1.

Turning to FIG. 3, a flow chart is seen of the manner in which the master prevents overloading of output port buffers. At 100, the master reads the request field bits to see which input ports are contending for use of the bidirectional data bus 18. At 105, the master reads into a buffer the internal routing field (i.e., internal destination address) which is placed on the data bus by the input port which was provided access to the bus by the grant field of the previous frame. At 110, the master compares the internal destination address to a first address register 34a associated with counter 32a that it maintains. If, at 115 the internal destination address matches the address in the register, the counter associated with that register is incremented at 120. Then, at 125 the count of the counter is compared to a high threshold, and if it equals or exceeds the threshold, a control or alert signal (which is used in the arbitration decision) is generated at 130. If the count does not exceed the high threshold, a determination is made at 150 as to whether the address register is the last address register being maintained by the master.

Returning to step 115, if the internal destination address does not match the address in the register, at 135, the count of the counter associated with that register is decremented. At 140, the count is compared to a low threshold (e.g., 0). If the count reaches the low threshold, at 145, the counter and associated address register are freed (i.e., may be overwritten). Regardless, at 150, a determination is made as to whether the address register is the last address register being maintained by the master. If there are more address registers which have not been compared to the internal destination address, at 155, the address of the next register is obtained. The master then steps through steps 110–150 as necessary until it has been determined at 150 that the last address register has been compared to the internal destination address. Then, at 160, a determination is made by the master as to whether any counter has been incremented as a result of steps 110–150. If no counter has been incremented, at 165, a new counter with the internal destination address of the cell buffered at 105 is initialized. Regardless, based on the request field read at 100, and any alert signal which might have been generated at 130, the master, at 170, conducts an arbitration according to any desired arbitration algorithm. The result of the arbitration is processed into grant bits which are sent at 180 in the grant field of the frame. As previously mentioned, when an alert signal is generated at 130, according to the preferred embodiment of the invention, the master stalls the bus until the counter decrements below the first threshold either by deasserting the GEN bit in the Grant field (see FIG. 2) or by placing its own address in the grant field. According to an alternative embodiment of this aspect of the invention, upon receiving the alert, the master grants bus access to the input port associated with the output port having the destination address associated with the counter which has reached the high threshold. The reason for providing bus access to that input port is the theory that the particular input port in question is unlikely to be sending data to its own output. If this alternative embodiment is utilized, a second high threshold (typically equal to the first threshold plus one) is preferably provided so that the master can stall the bus if the second high threshold is reached (thereby indicating that the input port is indeed sending data to its associated output port).

In a similar vein, and according to another (less preferred) alternative embodiment of this aspect of the invention, upon receiving the alert, the master grants bus access to an input port other than the input port that it granted access to in the previous frame. The reason for providing bus access to the "other" port is the theory that any particular "other" input port is statistically less likely to be sending data to the overloaded output port. Again, a second high threshold preferably equal to the first threshold plus one is provided so that the master can stall the bus if the second high threshold is reached (thereby indicating that the "other" input port is indeed sending data to the overloaded output port).

It will be appreciated by those skilled in the art that by monitoring the internal destination addresses of cells as described above, the fast buffer memory of the output ports of the ATM switch of the invention can be limited to relatively small sizes (based on the bandwidth of the output port; e.g., 10 milliseconds of buffering) without significantly affecting the functionality or throughput of the switch.

There have been described and illustrated herein an ATM switch system and method which limits bursts to ATM output ports and thereby reduces the amount of buffer storage required for the output ports. While particular embodiments of the invention have been described, it is not intended that the invention be limited thereto, as it is intended that the invention be as broad in scope as the art will allow and that the specification be read likewise. Thus, while particular values for incrementing and decrementing counters were described, it will be appreciated that other values could be utilized. For example, while the decrement value K was described as preferably equal to two, other values can be utilized. Also, if desired, different decrement (or increment) values can be used for different counters. Similarly, while particular values were provided for the high threshold where an alert signal is generated and the low threshold which permits the counter to be used to track another output port, it will be appreciated that other threshold values could be utilized. In fact, if desired, additional thresholds could be utilized. Further, while the invention was described as being implemented in DSPs, counters, etc., it will be appreciated that the same functions could be implemented in other hardware and/or software. In addition, while counters were described as being freely associated with different ports depending upon particular traffic situations, it will be appreciated that a bank of counters which are always associated with specific output ports can be utilized. Also, while a particular software flow chart for the master was described, it will be appreciated that the functions performed by the master could be implemented in other ways. Further yet, while a particular internal framing mechanism for the ATM cell was described, it will be appreciated that other mechanisms can be utilized provided a field for an internal destination address is utilized. It will therefore be appreciated by those skilled in the art that yet other modifications could be made to the provided invention without deviating from its spirit and scope as so claimed.

We claim:

1. An ATM switch system, comprising:
   a) a plurality of input ports each having input buffer memory;
   b) a plurality of output ports each having associated buffer memory; and
   c) a source traffic control system including a shared bus which couples said input ports and said output ports, and a switch controller which controls transfer of data among said input ports and said output ports via said shared bus according to a frame,
      said frame including a field for an internal destination output port address, a request field for allowing input ports to request write access to said shared bus, and a grant field for allowing said switch controller to designate which of said plurality of input ports is to receive write access to said shared bus,
      said switch controller including means for monitoring said internal destination output port address field, and a plurality of counters at least temporarily associated with certain of said output ports, means for incrementing a count of one of said counters when a value in said internal destination output port address field corresponds to the one of said output ports associated with that counter, and for decrementing said count of one of said counters when said value in said internal destination output port address field corresponds to one of said output ports not associated with that counter, means for comparing counts of said counters with a first threshold value and generating a signal in response thereto, and arbiter means for receiving said signal and for generating a grant based at least partially thereon.

2. The ATM switch system according to claim 1, wherein:
   said means for incrementing a count of one of said counters when a value in said internal destination output port address field corresponds to the one of said output ports associated with that counter, and for decrementing said count of one of said counters when said value in said internal destination output port address field corresponds to one of said output ports not associated with that counter, increments at a first rate, and decrements at a second rate greater than said first rate.

3. The ATM switch system according to claim 1, wherein:
   said switch controller further includes a plurality of address registers associated with said plurality of counters.

4. The ATM switch system according to claim 1, wherein:
   said signal is an alert signal, and said first threshold value is set at a predetermined value which causes said alert signal to be generated before a buffer memory of said output port overflows.

5. The ATM switch system according to claim 4, wherein:
   said arbiter means for generating a grant generates said grant for other than said plurality of input ports after said alert signal is generated.

6. The ATM switch system according to claim 4, wherein:
   said arbiter means for generating a grant generates said grant for the one of said input ports associated with the one of said output ports whose associated counter has caused said alert signal.

7. The ATM switch system according to claim 6, wherein:
   said means for comparing counts compares said counts to a second threshold greater than said first threshold.

8. The ATM switch system according to claim 7, wherein:
   said means for comparing counts compares said counts to a low threshold value.

9. The ATM switch system according to claim 8, wherein:
   said means for comparing counts generates a second signal in response to comparing said counts to said low threshold value, said second signal being utilized by said switch controller to disassociate said counter from a specific output port.

10. The ATM switch system according to claim 1, wherein:
    said means for comparing counts compares said counts to a low threshold value and generates a second signal in response to comparing said counts to said low threshold value, said second signal being utilized by said switch controller to disassociate said counter from a specific output port.

11. In an ATM switch which includes a plurality of input ports with associated input buffers, a plurality output ports with associated buffers, a source traffic control system having a shared bus which couples the input ports to the output ports, and a switch controller which controls transfer of data among the input ports and the output ports via said shared bus according to a frame, the switch controller having a plurality of counters and an arbiter, a method for limiting ATM data bursts to one of said output ports, the method comprising:
    a) during a first frame, causing each input port to place on the shared bus an internal destination output port address as overhead field of an ATM cell, upon sending an ATM cell to the one of said output ports;

b) monitoring said internal destination output port address with the switch controller;

c) during said first frame, incrementing a counter associated with the one of said output ports when the one of said output ports is addressed by said internal destination output port address, and decrementing any counter not associated with the output port addressed by said internal destination output port address; and d) comparing the count of said counter to a first threshold, and generating a signal when said counter reaches the first threshold; and e) arbitrating which, if any, of the input ports will be allowed to place an ATM cell onto the shared bus during a next frame, wherein said signal is used in said arbitrating.

12. The method according to claim 11, wherein:

said incrementing is accomplished at a first rate, and said decrementing is accomplished at a second rate which is greater than said first rate.

13. The method according to claim 11, wherein:

said signal is an alert signal, and said first threshold value is set at a value which causes said signal to be generated before a buffer of an output port overflows.

14. The method according to claim 13, wherein:

when said alert signal is generated, said arbitrating comprises deasserting a grant enable field to prevent any of said input ports from placing an ATM cell onto the shared bus during said next frame.

15. The method according to claim 13, wherein:

when said alert signal is generated, said arbitrating comprises generating a grant of access to the bus for said next frame for other than the plurality of input ports.

16. The method according to claim 13, wherein:

when said alert signal is generated, said arbitrating comprises generating a grant of access to the bus for said next frame to the one of said input ports associated with the one of said output ports whose associated counter has caused said signal to be generated.

17. The method according to claim 11, further comprising:

comparing said count to a low threshold value, and disassociating a said counter associated with the one of said output ports from the one of said output ports when the count of said counter decreases to said low threshold value.

* * * * *